(12) United States Patent
Kamatsuchi

(10) Patent No.: US 7,921,002 B2
(45) Date of Patent: Apr. 5, 2011

(54) METHOD AND SYSTEM FOR SIMULATING FLOW OF FLUID AROUND A BODY

(75) Inventor: Toshihiro Kamatsuchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 568 days.

(21) Appl. No.: 12/005,381

(22) Filed: Dec. 27, 2007

(65) Prior Publication Data

US 2008/0177511 A1    Jul. 24, 2008

Related U.S. Application Data

(60) Provisional application No. 60/878,413, filed on Jan. 4, 2007.

(51) Int. Cl.
G06F 7/60 (2006.01)
G06F 17/10 (2006.01)
G06G 7/48 (2006.01)
G06G 7/50 (2006.01)
G06G 7/57 (2006.01)
G01F 23/00 (2006.01)
G01N 11/00 (2006.01)

(52) U.S. Cl. ............ 703/9; 703/2; 703/10; 702/12; 702/50; 73/37

(58) Field of Classification Search ............ 703/9, 2, 703/10; 702/12, 50; 73/37
See application file for complete search history.

(56) References Cited

U.S. PATENT DOCUMENTS 6,519,553 B1 * 2/2003 Barnette et al. .......... 703/2
7,430,500 B2 * 9/2008 Lei et al. .................. 703/9
7,590,515 B2 * 9/2009 Richards et al. .......... 703/9

FOREIGN PATENT DOCUMENTS

JP    2005-078416    3/2005

OTHER PUBLICATIONS

Ogawa, T., "Development of a flow solver using the adaptive Cartesian mesh algorithm", 1999, Journal of Wind Engineering and Industrial Aerodynamics, No. 81, pp. 377-389.*

Nakahashi et al. "High-Density Mesh Flow Computations by Building-Cube Method", 2004, Computational Fluid Dynamics, pp. 121-126.*

(Continued)

Primary Examiner — Kamini S Shah
Assistant Examiner — Suzanne Lo
(74) Attorney, Agent, or Firm — Squire, Sanders & Dempsey (US) LLP

(57) ABSTRACT

A simulation method for flow of fluid around a body, according to the present invention, comprising dividing a target domain of simulation into a plurality of computational unit domains named cubes, generating an uniform number of Cartesian mesh elements named cells, in each of the cubes, performing computation in the cubes in each computational step, and exchanging data between adjacent cubes after completion of each computational step. In dividing the target domain of simulation into cubes, division is repeated while a ratio between adjacent cube sizes is maintained in a certain range until cubes including a boundary between the body and the fluid, is small enough to obtain a desired resolution so that sizes of the cubes are appropriately determined according to a shape of the body.

10 Claims, 21 Drawing Sheets

☐ FLUID CELLS
⊕ INTERFACE CELLS
● SOLID CELLS
◻ BOUNDARY POINTS
○ SUBGRID POINTS

OTHER PUBLICATIONS

Calder et al. "High-Performance Reactive Fluid Flow Simulation Using Adaptive Mesh Refinement on Thousands of Processors", 2000, IEEE, 16 pages.*

Aftosmis et al. "Adaptive Cartesian Mesh Generation", 1999, NASA, 35 pages.*

Uzgoren et al. "Marker-Based, 3-D Adaptive Cartesian Grid Method for Multiphase Flow Around Irregular Geometries", Jul. 15, 2008, Communications in Computational Physics, vol. 5, No. 1, pp. 1-41.*

Obayashi, S., et al., "*Convergence Acceleration of a Navier-Stokes Solver for Efficient Static Aeroelastic Computations*", AIAA Journal vol. 33, No. 6, Jun. 1995, pp. 1134-1141.

Sharov, D., et al., *Reordering of Hybrid Unstructured Grids for Lower-Upper Symmetric Gauss-Seidel Computations*, AIAA Journal, vol. 36, No. 3, 1998, pp. 484-489.

Yamamoto, S. et al., "*Higher-Order-Accurate Upwind Schemes for Solving the Compressible Euler and Navier-Stokes Equations*", Computer Fluids, vol. 22, No. 2/3, 1993, pp. 259-271.

* cited by examiner

FIG. 3
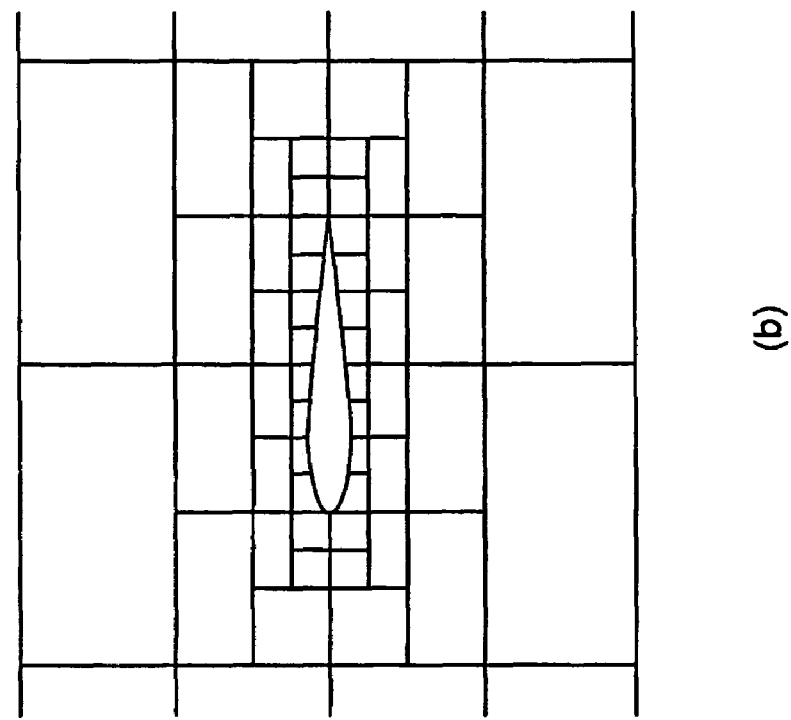
(b)
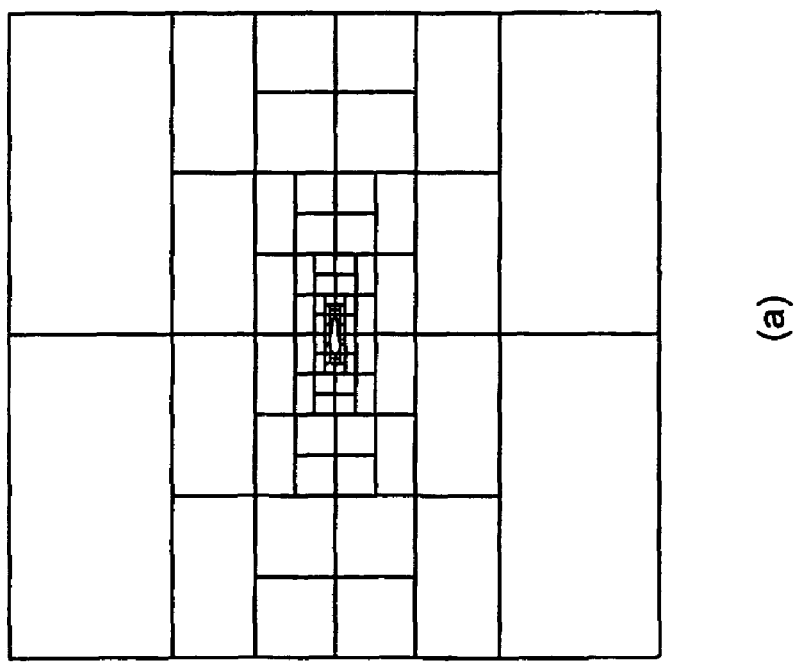
(a)

ROOT CUBE (LEVEL 1)

| LEVEL | POSITION |
|---|---|
| 2 | (1,1) |
| 3 | (0,0) |
| 4 | (0,0) |
| 5 | (1,0) |

PEDIGREE OF THE CUBE ■

| LEVEL | 1 | 2 | 3 | 4 | 5 | IN DECIMAL |
|---|---|---|---|---|---|---|
| x |  | 1 | 0 | 0 | 1 | = 9 |
| y |  | 1 | 0 | 0 | 0 | = 8 |

□ FLUID CELLS
⊛ INTERFACE CELLS
● SOLID CELLS
▫ BOUNDARY POINTS

☐ FLUID CELLS
⊕ INTERFACE CELLS
● SOLID CELLS
▫ BOUNDARY POINTS
○ SUBGRID POINTS

FIG. 16A
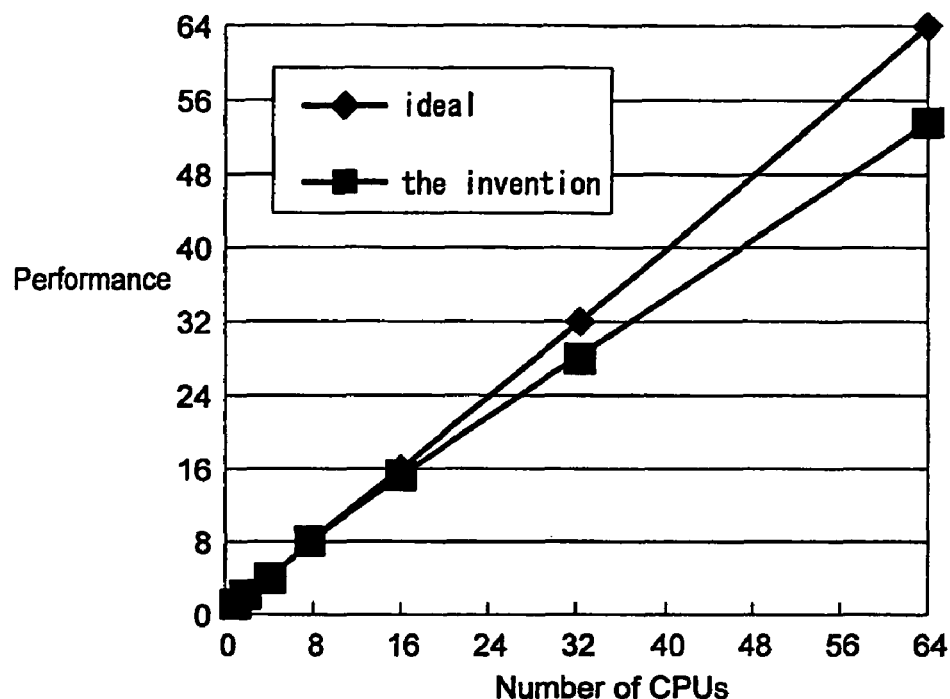
(a)
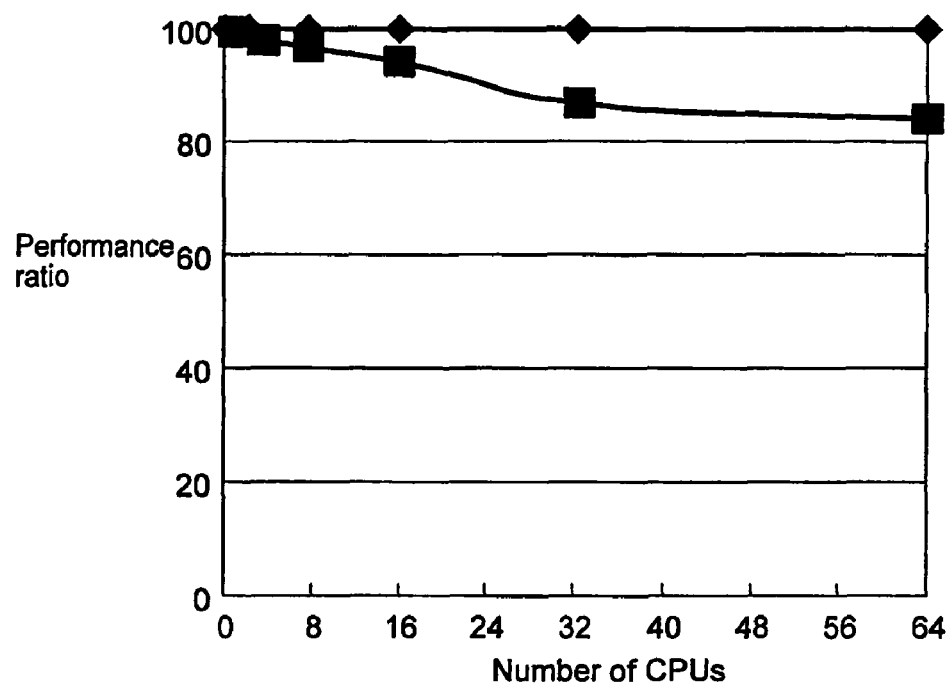
(b)

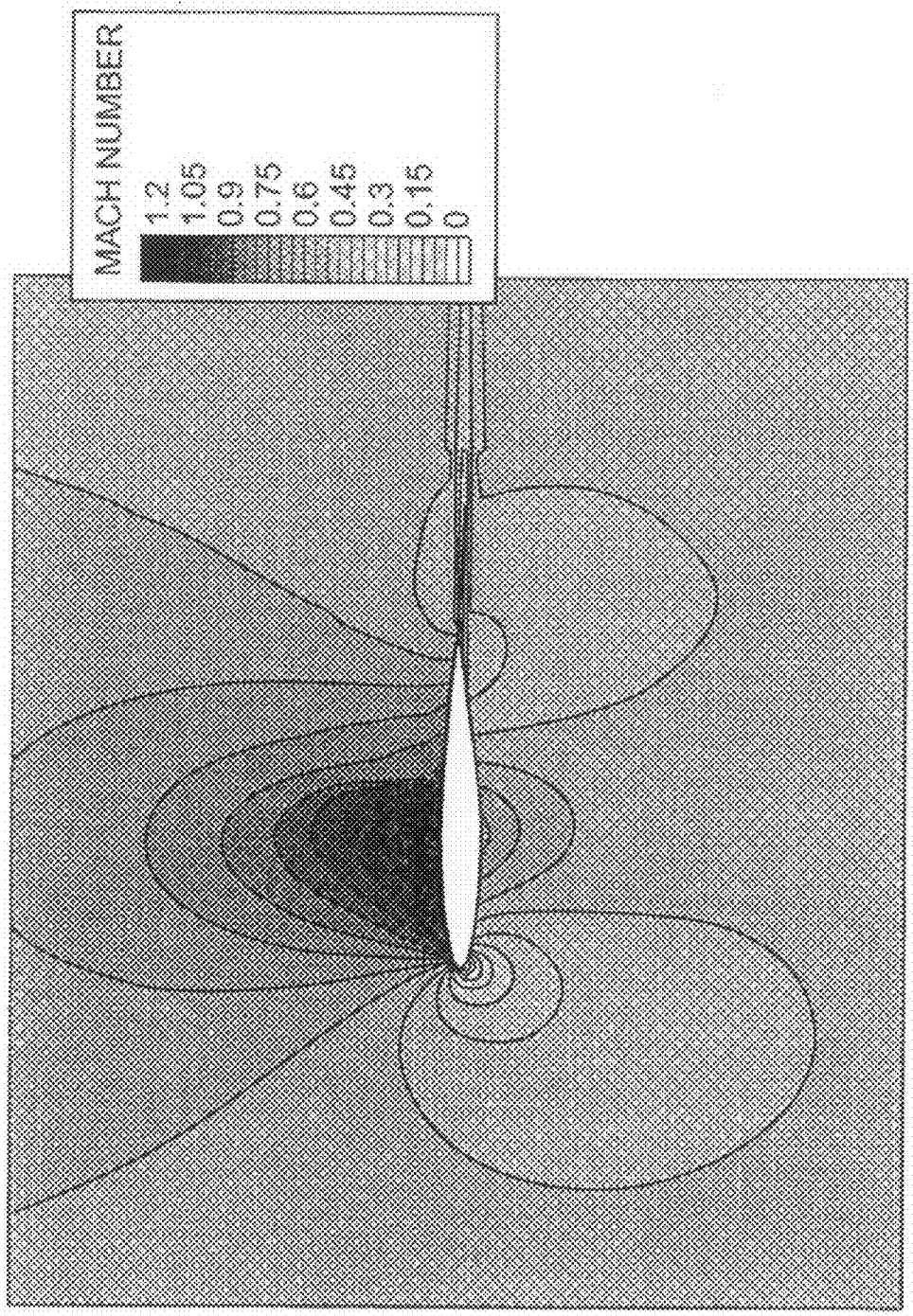

METHOD AND SYSTEM FOR SIMULATING FLOW OF FLUID AROUND A BODY

CROSS-REFERENCE TO RELATED APPLICATIONS

This application claims priority of U.S. provisional application No. 60/878,413 filed on Jan. 4, 2007.

FIELD OF THE INVENTION

The present invention relates to a method and a system for simulating flow of fluid around a body.

BACKGROUND OF THE INVENTION

Solutions for analyzing flow of fluid around a body by computational fluid dynamics (CFD) can be classified into structured mesh solver, unstructured mesh solver and Cartesian mesh solver (as shown in the second paragraph and FIGS. 1 to 3 of JP2005-78416A).

Table 1 is a table in which characteristics of structured mesh solver, unstructured mesh solver and Cartesian mesh solver are summarized.

TABLE 1

|  | Structured Mesh Solver | Unstructured Mesh Solver | Cartesian Mesh Solver |
| --- | --- | --- | --- |
| Conforming to Complex Geometry | Limited | Good | Bad |
| Solution Adaptive Grid Control | Limited | Very Good | Bad |
| High-resolution Scheme | Very Good 2nd Order | Limited 2nd Order | Limited 2nd Order |
| Easy Mesh Generation | Bad | Limited | Very Good |
| Large Scale Parallel Computation | Good | Limited | Good |
| Large Scale Visualization | Good | Limited | Limited |

Structured mesh solver is very good for application in high resolution scheme, but a procedure for generating mesh is complicated. Further, an application of structured mesh solver is subject to some types of constraints in conforming to complex geometry and in solution adaptive grid control (in which grid shapes are adapted to solutions). Unstructured mesh solver is very good for application in solution adaptive grid control and good for conforming to complex geometry. However, an application of unstructured mesh solver is subject to some types of constraints in high resolution scheme and in mesh generation. Cartesian mesh solver is very good at mesh generation, but not good for conforming to complex geometry and for application in solution adaptive grid control. Further, an application of Cartesian mesh solver is subject to some types of constraints in high resolution scheme. Table 1 also shows how the three solvers mentioned above is applied to large scale parallel computation and large scale visualization.

Thus there has not been a method for simulating flow of fluid around a body that is good for conforming to complex geometry, application in solution adaptive grid control, application in high resolution scheme and mesh generation.

Accordingly, there have been needs for a method and a system for simulating flow of fluid around a body that are good for conforming to complex geometry, application in solution adaptive grid control, application in high resolution scheme and mesh generation.

SUMMARY OF THE INVENTION

A simulation method for flow of fluid around a body, according to the present invention, comprising dividing a target domain of simulation into a plurality of computational unit domains named cubes, generating an uniform number of Cartesian mesh elements named cells, in each of the cubes, performing computation in the cubes in each computational step, and exchanging data between adjacent cubes after completion of each computational step. In dividing the target domain of simulation into cubes, division is repeated while a ratio between adjacent cube sizes is maintained in a certain range until cubes including a boundary between the body and the fluid, is small enough to obtain a desired resolution so that sizes of the cubes are appropriately determined according to a shape of the body.

A system for simulating flow of fluid around a body, according to the present invention, comprising a mesh generating section for dividing a target domain of simulation into a plurality of computational unit domains named cubes and for generating an uniform number of Cartesian mesh elements named cells, in each of the cubes, a computation section for performing computation in the cubes in each computational step and for exchanging data between adjacent cubes after completion of each computational step, and a computation control section for controlling computation of simulation. When the mesh generating section divides the target domain of simulation into cubes, division is repeated while a ratio between adjacent cube sizes is maintained in a certain range until cubes including a boundary between the body and the fluid, is small enough to obtain a desired resolution so that sizes of the cubes are appropriately determined according to a shape of the body.

A method and a system according to the present invention, use cubes sizes of which can be determined according to a shape of the body. Accordingly, the method and system are good for conforming to complex geometry, application in solution adaptive grid control and application in high resolution scheme. Further, each cube is provided with a uniform number of cells, each cell being an element of Cartesian mesh. Accordingly, mesh generation is easy and computational load of each cube is substantially uniform so that load distribution in parallel computation is easy.

DESCRIPTION OF THE DRAWINGS

FIG. 3 shows cubes generated around the body.

FIG. 16A shows performance of the simulation system according to the present embodiment.

FIG. 17 shows Mach number around an airfoil.

DETAILED DESCRIPTION OF THE PREFERRED EMBODIMENTS

The basic idea of the present invention is to apply a simple Cartesian mesh in an attempt to develop a fast, low-storage method for time-accurate computation of the Navier-Stokes equations for a complex geometry.

In the method according to the invention, the computational domain is divided into a number of tree data structured sub-domains. The sub-domains are named cubes. A size of each cube is determined by adapting to the geometry of the body and the local characteristic flow length. A uniformly divided Cartesian mesh is generated in each cube. Elements of the Cartesian mesh are called cells. All cubes contain the same number of cells, so that the local computational resolution is determined by the cube size. The same mesh density among all cubes simplifies the parallel computation, because all cubes have substantially the same computational load.

FIG. 3(a) shows cubes generated around the body. FIG. 3(b) is a partially enlarged drawing of FIG. 3(a).

Figure 1:
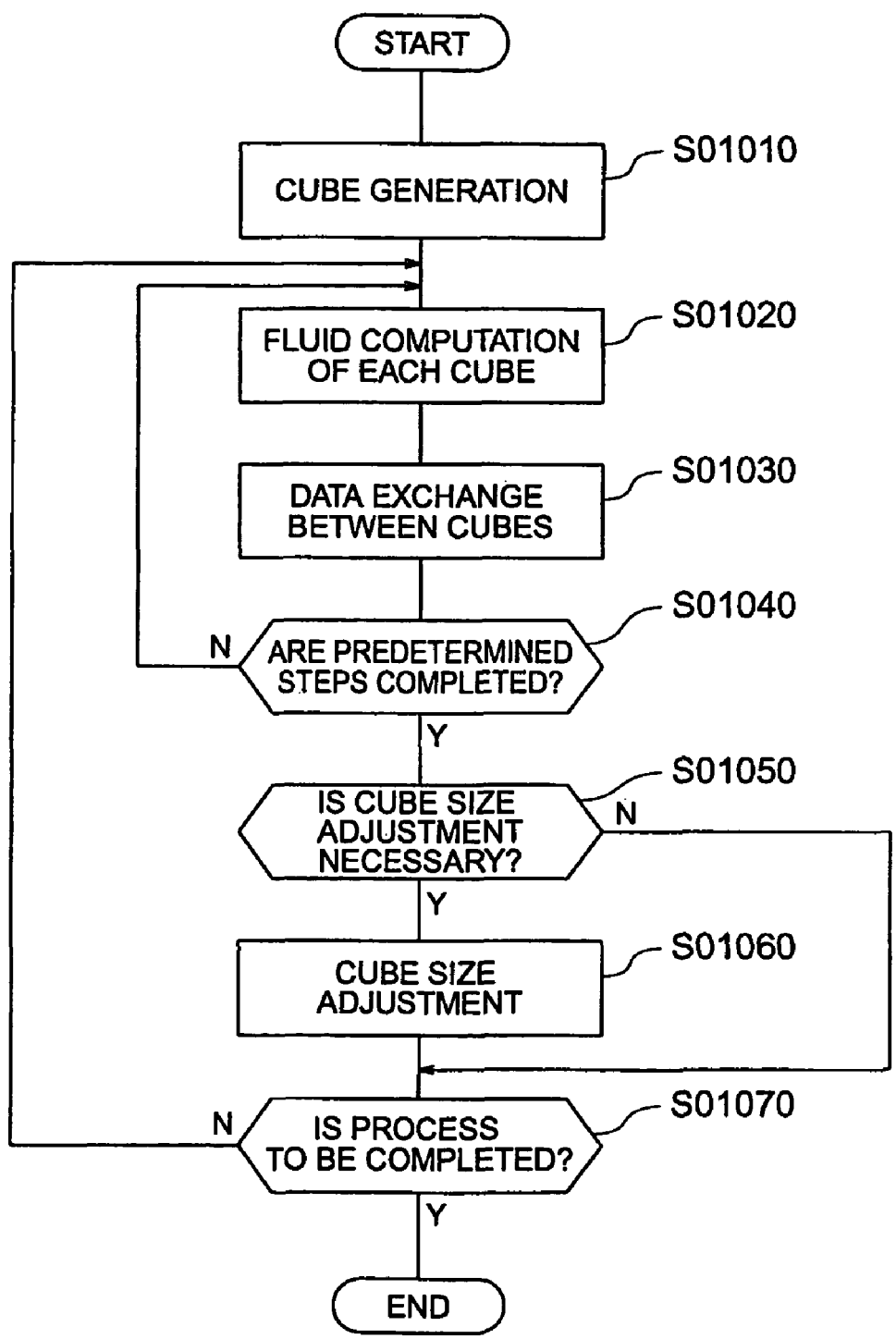
FIG. 1 is a flow chart showing a simulation method according to an embodiment of the present invention.

FIG. 1 is a flow chart showing a simulation method according to an embodiment of the present invention.

In step S01010, cubes are generated. A procedure for generating cubes is described hereafter.

In step S01020, fluid computation for each cube is performed. The fluid computation for the cubes is performed, for example, by a plurality of processors in parallel. The fluid computation will be described hereafter.

In step S01030, data are exchanged between a certain cube and its neighboring ones. Data are exchanged for each step of the fluid computation.

In step S01040, it is determined whether or not a predetermined number of computation steps of the fluid computation has been performed. If the predetermined number of the computation steps of the fluid computation has been performed, the process proceeds to step S01050. If the predetermined number of the computation steps of the fluid computation has not been performed, the process returns to step S01020 and steps S01020 and S01030 are performed.

In step S01050, it is determined whether or not cube size adjustment is required. If the cube size adjustment is determined to be required, the process proceeds to step S01060. If the cube size adjustment is not determined to be required, the process proceeds to step S01070.

In step S01060, the cube size adjustment is performed. The cube size adjustment will be described hereinafter.

In step S01070, it is determined whether or not it is when the simulation is to be completed. If it is determined to be when the simulation is to be completed, the simulation is completed. If it is not determined to be when the simulation is to be completed, the process returns to step S01020.

Cube Generation

In the present embodiment, cube generation follows two steps. The first step is to generate cubes of various sizes to fill the flow field as shown in FIG. 3. The second step is to generate Cartesian mesh containing cells as elements in cubes located near the body.

Figure 2:
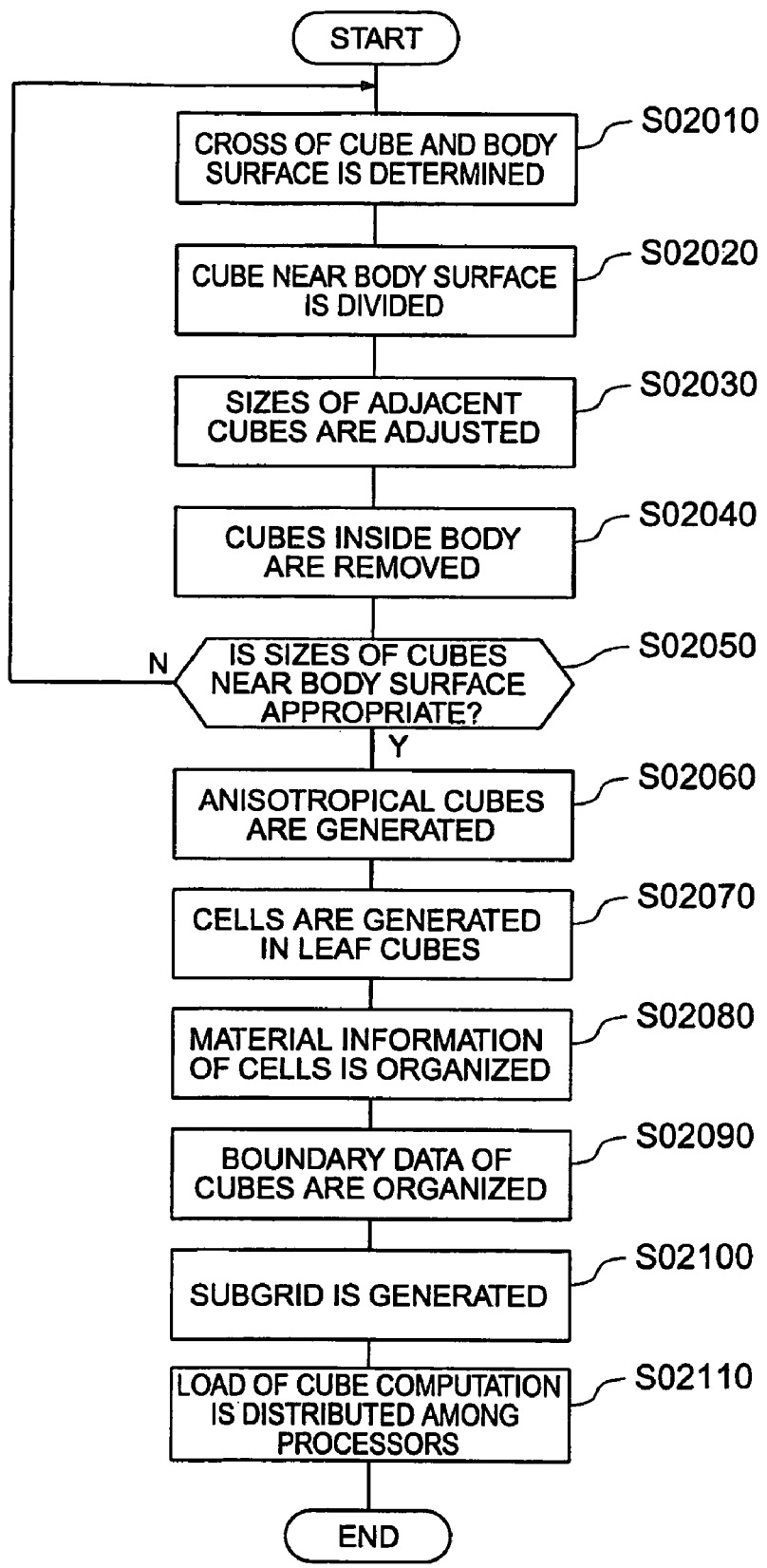
FIG. 2 is a flow chart showing a process for generating cubes according to the present embodiment.

FIG. 2 is a flow chart showing a process for generating cubes according to the present embodiment. The flow chart shown in FIG. 2 shows the detail of cube generation in step S01010 of FIG. 1. This process shown in FIG. 2 is started from a single cube that covers an entire flow field with a coarse Cartesian grid of equal mesh spacing in each direction. The cubes that include or cross the body boundary are then recursively subdivided into arbitrary identical child cubes until the minimum size reaches the specified spatial resolution.

In step S02010, it is determined whether or not a cube crosses the body boundary.

In step S02020, cubes that cross the body boundary are subdivided. In the present embodiment, cubes that cross the body boundary are subdivided into 8 ($=2^3$) identical child cubes. In the present embodiment, how cubes have been subdivided is represented by a tree data structure.

Figure 5:
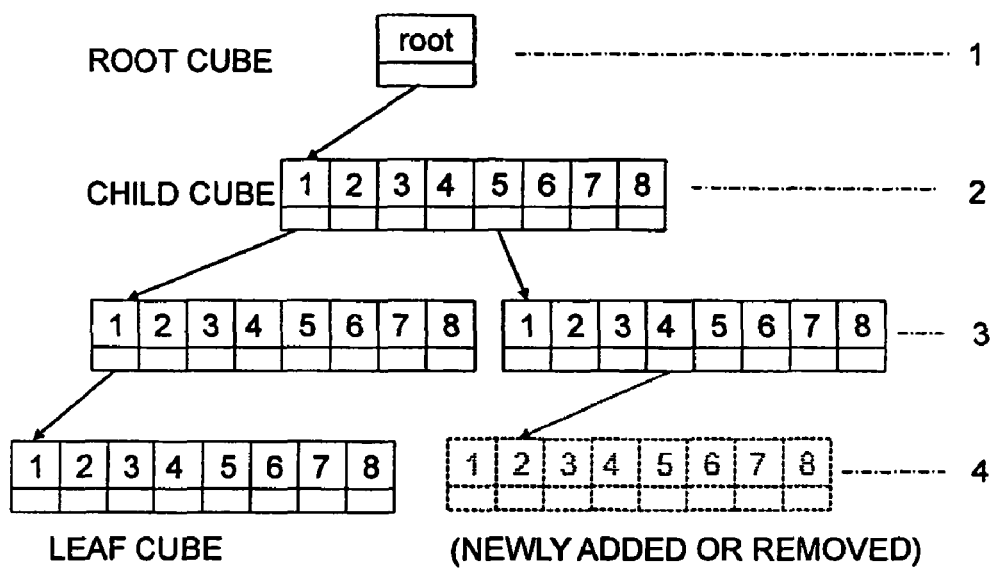
FIG. 5 shows a tree data structure representing how cubes have been subdivided.

FIG. 5 shows a tree data structure representing how cubes are subdivided. The single cube that covers the entire flow field is represented as a root cube. The root cube is denoted by level 1 and the number of level of a cube increases with the number of subdivision that the cube has undergone. When a certain cube is divided into a plurality of cubes, the certain cube is called a parent cube while the plurality of cubes are called child cubes. A parent cube has a pointer to its own child cubes. Thus, the cube generation is denoted by the level of the subdivision, and a cube at the lowest level is called a leaf cube. Only the leaf cubes are used for flow computation. In the tree data structure, the leaf cubes can be tracked down from the root cube by following the pointer to the child cubes. For mesh adaptation, cubes are appended or removed only at the lowest level.

In step S02030, sizes of adjacent cubes are adjusted. The level difference between adjacent cubes is restricted to one in order to minimize the data transfer error between cubes. Therefore, a cube that has a two-level difference compared to its adjacent cubes is detected and divided.

In step S02040, the cubes that are located inside the body are removed. The reason is that they are not used for fluid computation.

In step S02050, it is determined whether sizes of the cubes that cross the body boundary have reached the specified spatial resolution. If sizes of the cubes that cross the body boundary have reached the specified spatial resolution, the process proceeds to step S02060. If sizes of the cubes that cross the body boundary have not reached the specified spatial resolution, the process returns to step S02010 and subdivision is repeated.

In step S02060, anisotropic cubes are generated.

Figure 6:
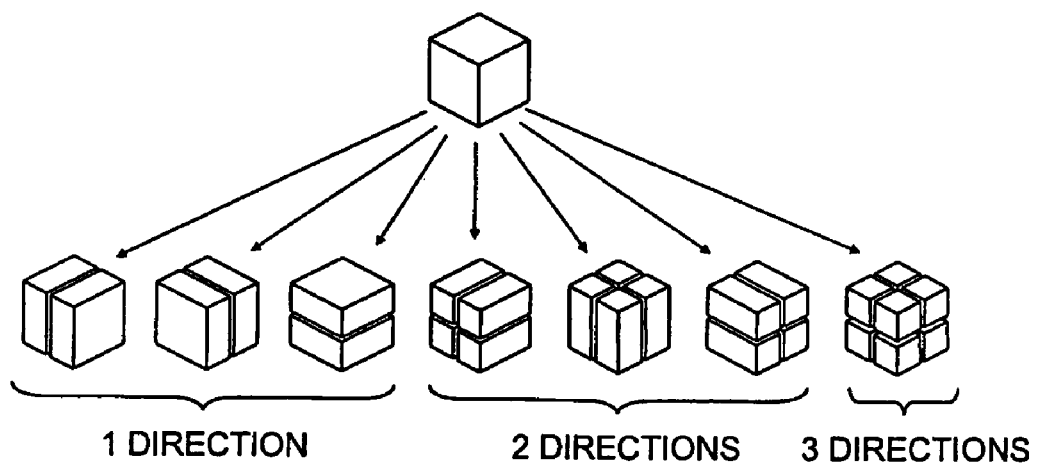
FIG. 6 shows the anisotropically subdivided cubes.

FIG. 6 shows the anisotropically subdivided cubes. The cube is divided in one direction or in two directions so that 2 ($=2^1$) or 4 ($=2^2$) child cubes are generated respectively. When a cube is anisotropically divided in N directions, the number of child cubes is $2^N$. Thus, the tree becomes a $2^N$-tree. When subdivided repeatedly in a specific direction, a cube has a larger aspect ratio. FIG. 3(a) shows such a case.

In step S02070, Cartesian mesh is generated in leaf cubes. In the present embodiment the Cartesian mesh in a leaf cube contains 16×16×16 cells of uniform size, for example. The number of cells contained in a leaf cube can be determined arbitrarily provided that the leaf cubes contain equal number of cells.

A leaf cube is a unit domain of fluid computation described hereinafter. Since the leaf cubes contain equal number of cells, the leaf cubes have uniform computational load.

In step S02080, material information on cells is organized. That is, each cell is marked, whether it is located inside or outside the body. For example, cells inside the body are marked with 0, while cells outside the body are marked with 1. The body boundary is defined by the cell boundaries between adjacent cells having different marks.

Figure 4:
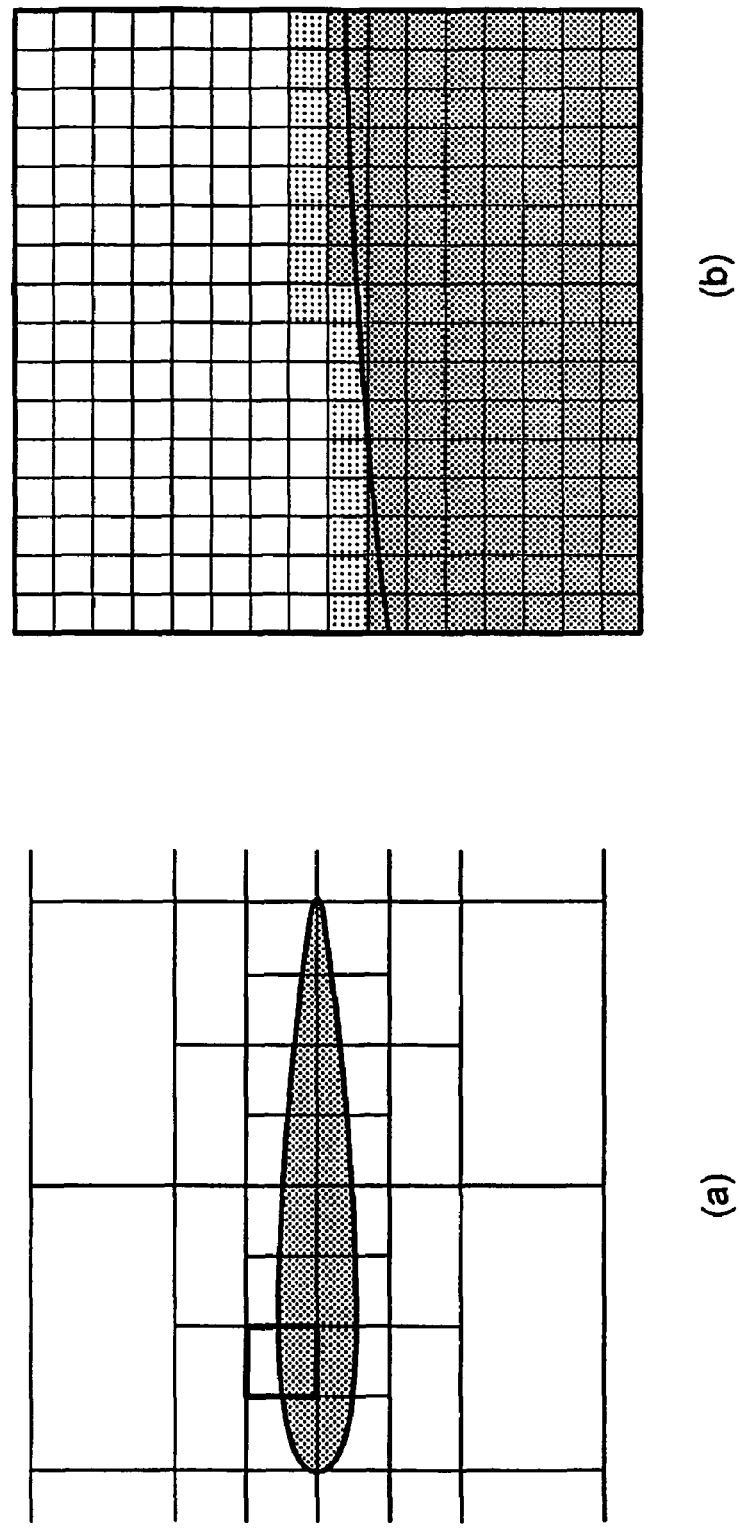
FIG. 4 shows cubes that include the boundary between the body (solid body) and fluid and cells in the cubes.

FIG. 4 shows cubes that include the boundary between the body (solid body) and fluid and cells in the cubes. FIG. 4(a) shows cubes around the body. FIG. 4(a) does not show cells in the cubes. FIG. 4(b) shows the cube marked with a bold frame in FIG. 4(a). FIG. 4(b) shows cells in the cube. In FIG. 4(b), cells located inside the body are marked with a dark shade while cells located outside the body are not marked with a shade. The boundary cells are marked with a light shade.

In the present embodiment, the number of the cells in a cube is as large as 16×16×16 and therefore material information on the cells in a cube should preferably be compressed. In the present embodiment, run-length method is utilized to compress material information on the cells in a cube.

Figure 7:
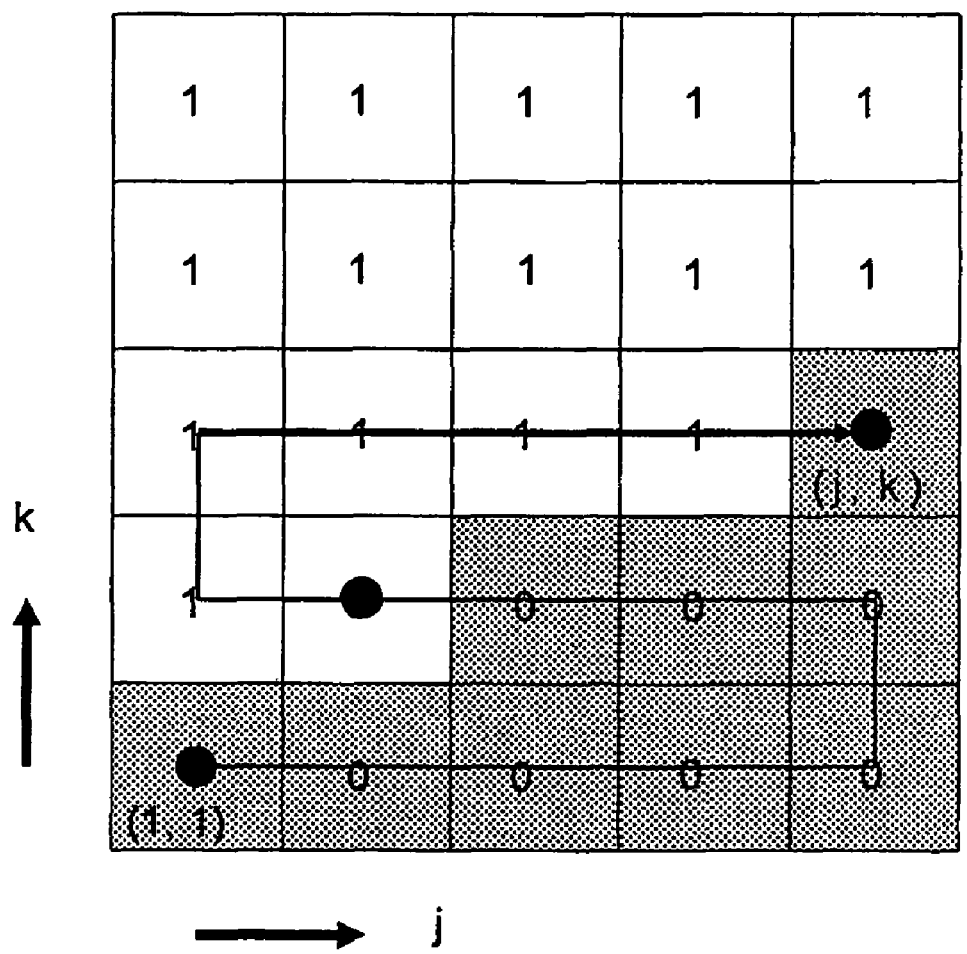
FIG. 7 is a drawing for illustrating a run-length data line in two dimensions.

FIG. 7 is a drawing for illustrating a run-length data line in two dimensions. As shown in FIG. 7, all cells have flags of 0 or 1. The minimum information, therefore, is the location where the cell changes the flag value. The location in the 2D field defined by (j,k) as shown in FIG. 7 can be described by a one-dimensional array of i by the following equations:

$$i = n_j(k-1) + pj + (1-p)(n_j + 1 - j) \quad (1)$$

$$p = \mathrm{mod}(k, 2) \quad (2)$$

where $n_j$ is the number of cells in a cube in the j-direction. With these equations, a one-dimensional array, say JK_runlength(i), can be defined as follows:
JK_runlength(1)=number of locations of the flag change
JK_runlength(2)=flag value at (1, 1)
JK_runlength(i) for $3 \leq i \leq$ JK_runlength(1)+2: locations of the flag change Decoding the one-dimensional array gives $$k = \mathrm{INTEGER}\lfloor(i-1)/n_j\rfloor + 1 \quad (3)$$

$$j = \lfloor i - n_j(k-1) - (1-p)(n_j+1)\rfloor/(2p-1) \quad (4)$$

where INTEGER(Z) is the integer part of real number Z.

Figure 8:
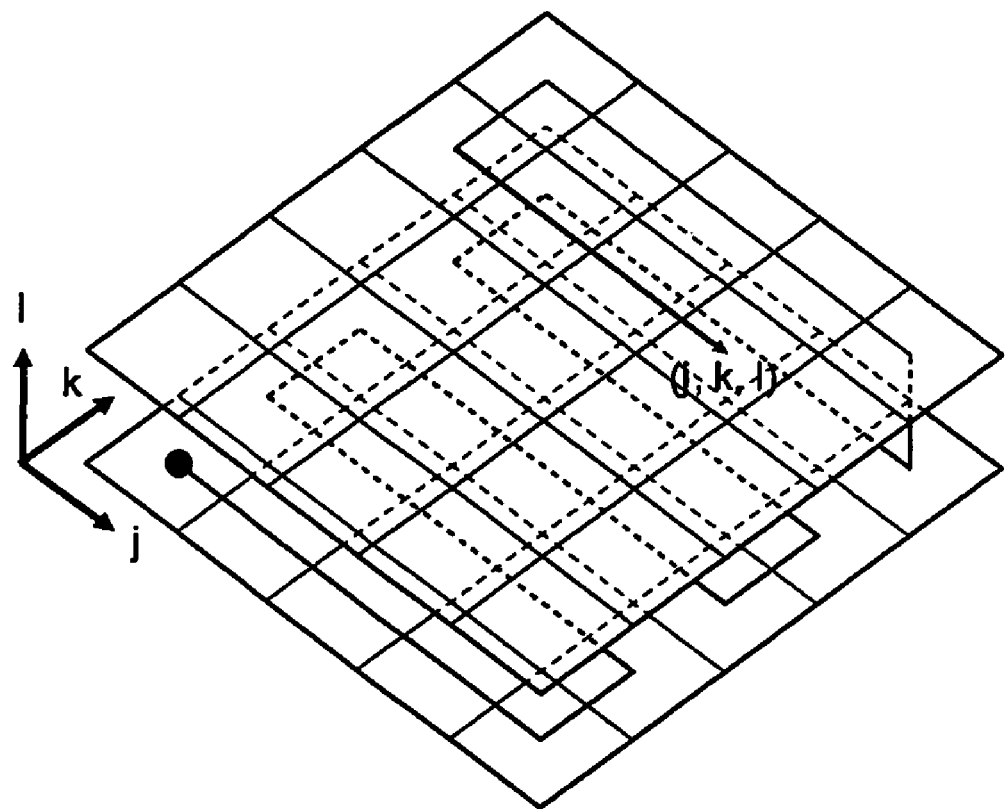
FIG. 8 is a drawing for illustrating a run-length data line in three dimensions (3D).

FIG. 8 is a drawing for illustrating a run-length data line in three dimensions (3D). For the 3D field defined by (j,k,l) shown in FIG. 8, $$i = qi_1 + (1-q)i_2 + n_j n_k(k-1) \quad (5)$$

$$i_1 = n_j(k-1) + pj + (1-p)(n_j + 1 - j) \quad (6)$$

$$i_2 = n_j(n_k - k) + p(n_j + 1 - j) + (1-p)j \quad (7)$$

$$p = \mathrm{mod}(k, 2), \, q = \mathrm{mod}(l, 2) \quad (8)$$

The run-length method mentioned above, significantly compresses material information on the cells in a cube.

In step S02090, cube boundary data are organized. In the present embodiment, each cube has the following data:
1) pointer to the parent and child cube
2) pedigree of the cube
3) subdivision level of the cube
4) material information on the cells Material information on the cells in 4) has already been described. Data in 1) to 3) correspond to the cube boundary data. The cube boundary data are used in step S01030 of FIG. 1 in order to find adjacent cubes of a certain cube when data are exchanged between the certain cube and its adjacent cubes.

Figure 9:
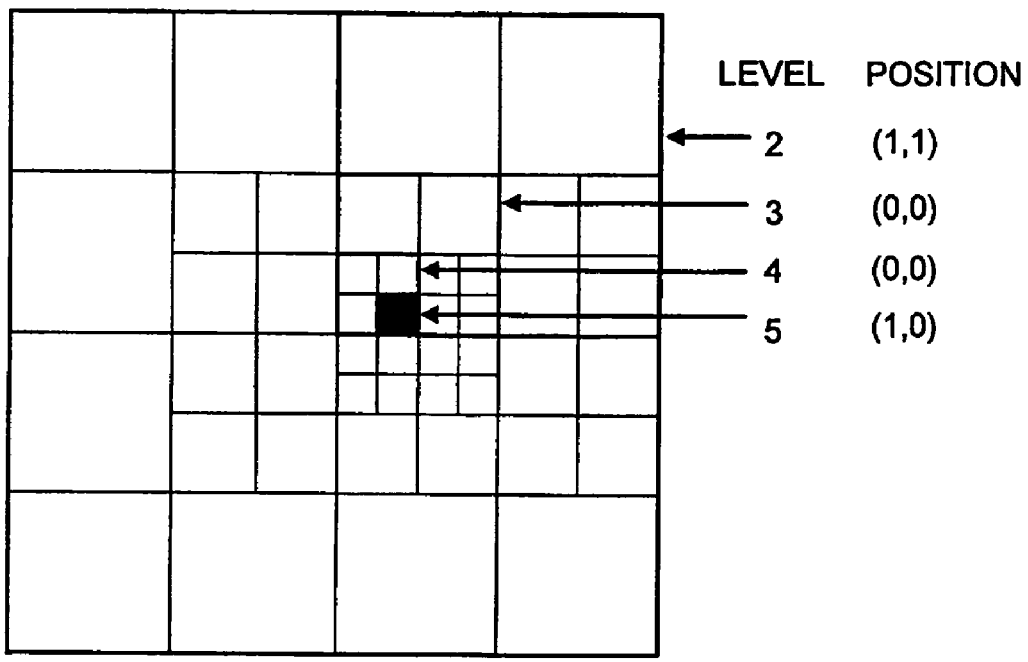
FIG. 9 is a drawing for illustrating definition of a pedigree of a cube.

FIG. 9 is a drawing for illustrating definition of a pedigree of a cube. The pedigree of a cube is utilized for a quick and simple search of adjacent cubes. The cube position is denoted by 0 or 1 in each direction according to the position in its parent cube. The pedigree of a cube is a table containing all the cube positions of its family from the root cube.

Figure 10:
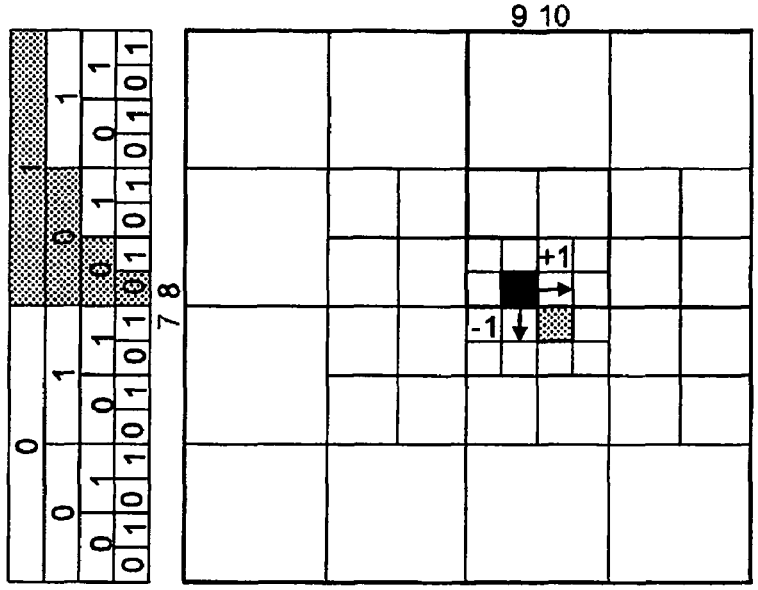
FIG. 10 shows the relationship between a cube position and the pedigree.

FIG. 10 shows the relationship between a cube position and the pedigree. The position of the black cube is expressed by the binary tree in each direction, the dotted area in the binary trees corresponding to the root cube. It is to be noted that the pedigree itself is the cube position in the root cube. Thus, the pedigree of the adjacent cube (the dotted cube) is obtained by the relative position from the black cube. An adjacent cube can be found by the pedigree without climbing up the tree, making the tree traversing one-way.

In step S02100, a subgrid is generated in a cube including the boundary between the body and fluid. It will be described hereinafter how a subgrid is generated.

In step S02110, load of cube computation is distributed among a number of processors. Since all cubes have equal number of cubes, load of all cubes is substantially uniform. Accordingly, load can be evenly distributed among a number of processors having an equal performance by assigning uniform number of cubes to each of the processors. Cube computation may be performed by a single processor.

Subgrid Generation

Figure 11:
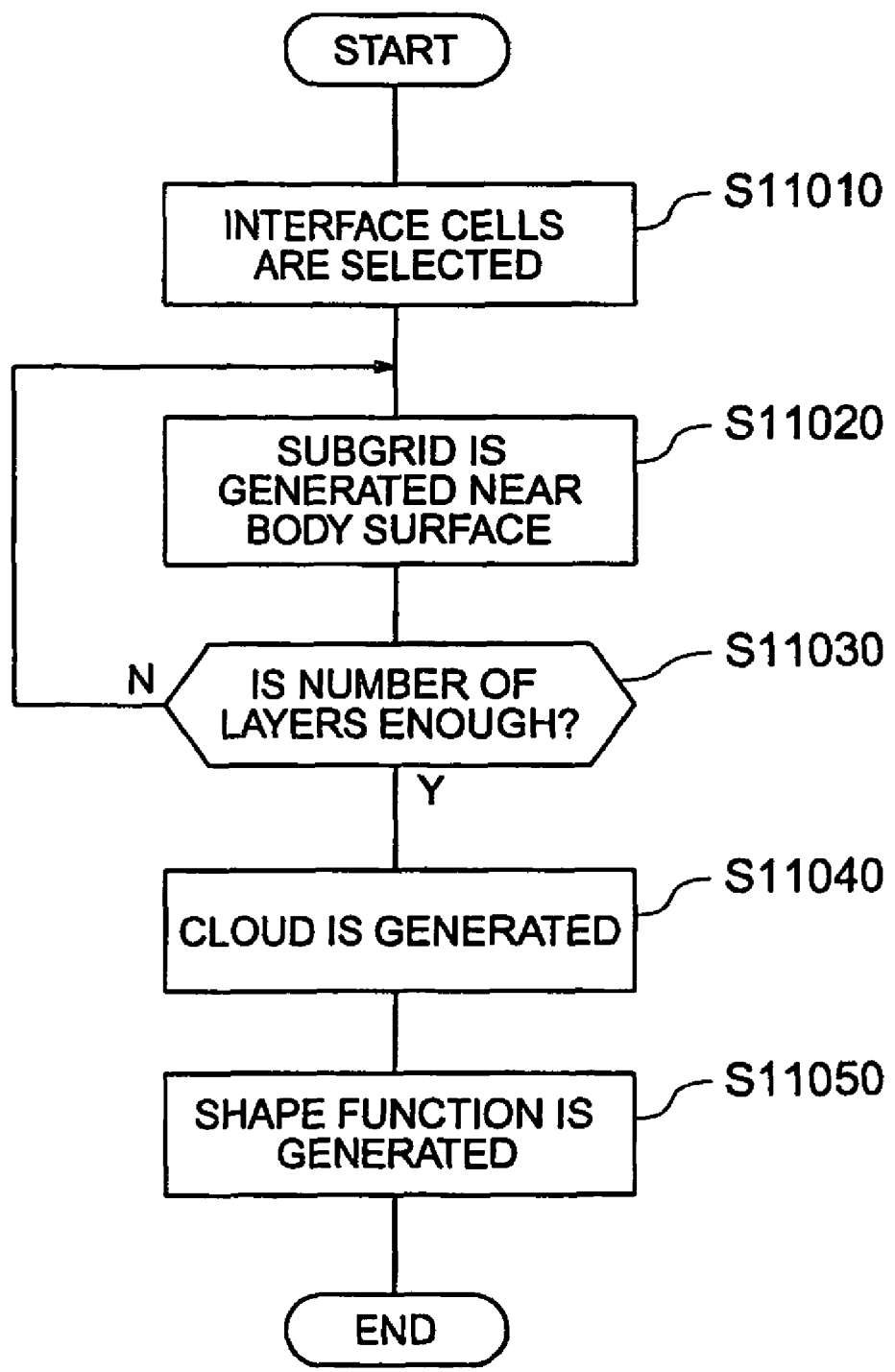
FIG. 11 is a flow chart showing a process for generating a subgrid according to the present embodiment.

FIG. 11 is a flow chart showing a process for generating a subgrid according to the present embodiment. The flow chart shown in FIG. 11 shows the detail of cube generation in step S02100 of FIG. 2.

In step S11010, interface cells in a leaf cube are selected.

Figure 12:
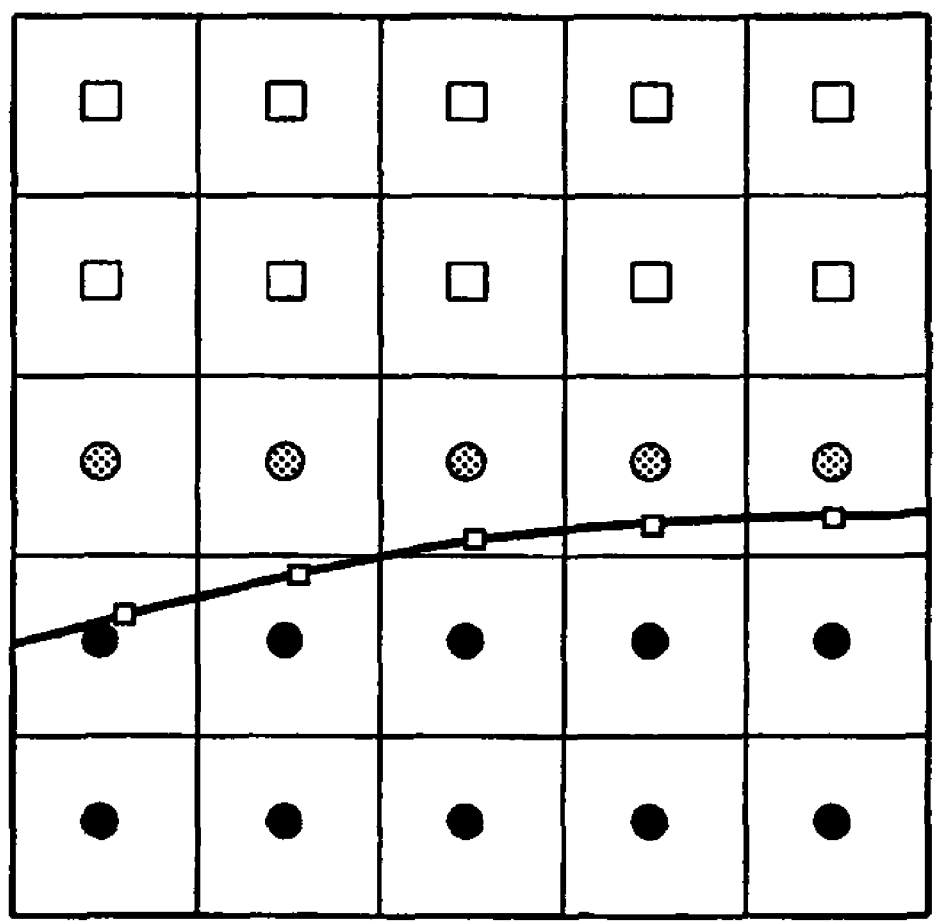
FIG. 12 shows a leaf cube including the boundary between the body (solid body) and fluid.

FIG. 12 shows a leaf cube including the boundary between the body (solid body) and fluid. In FIG. 12, cells inside the body (solid body) are marked with black circles while cells in fluid are marked with squares. Cells neighboring the body are named interface cells and marked with dotted circles.

In step S11020, a subgrid is generated near the body surface.

Figure 13:
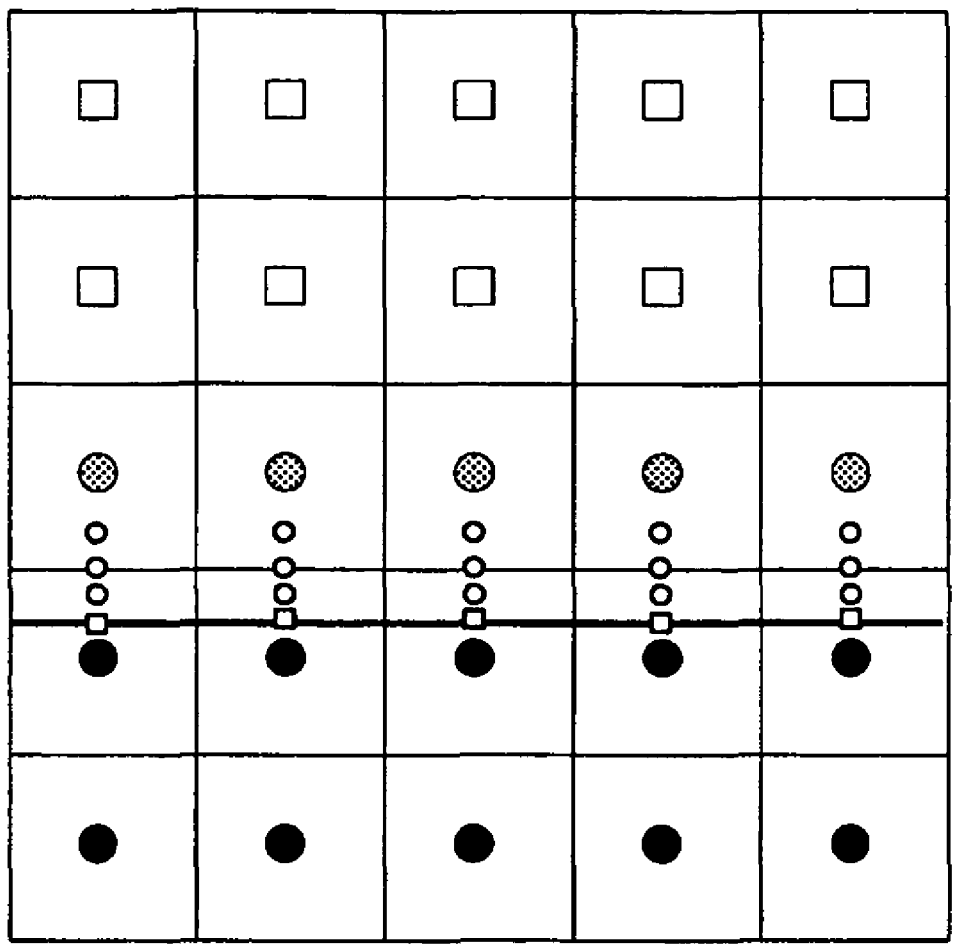
FIG. 13 shows a cube in which a subgrid is generated.

FIG. 13 shows a cube in which a subgrid is generated. In FIG. 13 cells inside the body, cells in fluid and interface cells are marked respectively with black circles, larger squares and dotted circles. Subgrid points and boundary points are marked respectively with white circles and smaller squares. A subgrid consists of new computational nodes added independently of the Cartesian mesh. These new nodes are defined by extending the interface cell point normally toward the immersed surface in several steps. This procedure will continue until the subgrid reaches the wall boundary and each layer within a subgrid remains a constant distance from the wall boundary.

In step S11030, it is determined whether or not the number of layers of the subgrid is large enough. If the number of layers is large enough, the process proceeds to step S11040. If the number of layers is not large enough, the process return to step S11020 to generate a subgrid again.

In step S11040, a cloud is generated. The cloud will be described hereinafter.

In step S11050, a shape function is generated. The shape function will be described hereinafter.

fluid Computation

The fluid computation will be described below.

Non-dimensionalized Navier-Stokes equations governing compressible viscous flow can be written in the conservative form as $$\frac{\partial U}{\partial t} + \frac{\partial F_j}{\partial x_j} - \frac{1}{Re}\frac{\partial G_j}{\partial x_j} = 0 \quad (9)$$

where t, x and Re are time, the coordinate, and the Reynolds number, respectively. It is noted that the symbols i, j, and k in the above and following equations represent coordinate indices, and Einstein's summation rule applies for respected indices. The conservative variables vector U, the inviscid flux vector F(U), and viscous flux vector G(U) are defined by $$U = \begin{bmatrix} \rho \\ \rho u_i \\ \rho e \end{bmatrix}, \quad (10)$$

$$F = \begin{bmatrix} \rho u_j \\ \rho u_i u_j + p\delta_{ij} \\ u_j(\rho e + p) \end{bmatrix},$$

$$G = \begin{bmatrix} 0 \\ \tau_{ij} \\ u_k \tau_{kj} + \kappa(\partial T/\partial x_j) \end{bmatrix}$$

Here, $\rho$, p, e, T and $\kappa$ are the density, pressure, specific total energy, temperature and thermal conductivity of the fluid, respectively, and $u_i$ represents the velocity components of the flow in the coordinate direction $x_i$. This set of equations is closed by the equation of state for a perfect gas $$p = (\gamma - 1)\rho\left(e - \frac{1}{2}u_j u_j\right) \quad (11)$$

where $\gamma$ is the ratio of the specific heats. The components of viscous stress tensor $\tau_{ij}$ are given by $$\tau_{ij} = \mu\left(\frac{\partial u_i}{\partial x_j} + \frac{\partial u_j}{\partial x_i}\right) - \frac{2}{3}\mu\frac{\partial u_k}{\partial x_k}\delta_{ij} \quad (12)$$

where $\delta_{ij}$ is Kronecker's delta symbol and $\mu$ is viscosity coefficient, determined by Sutherland's relationship.
For turbulent flow simulation, the viscosity $\mu$ is replaced by eddy viscosity which is evaluated by the Spalart and Allmaras one-equation model, for example.

Preconditioning is used in order to improve the efficiency for solving low-Mach-number flow problems with variable or constant density. To derive the preconditioned governing equations, the original system represented by Eq. (9) is transformed from conservative variable U to primitive variable Q as follows:

$$\frac{\partial U}{\partial Q}\frac{\partial Q}{\partial t} + \frac{\partial F_j}{\partial x_j} - \frac{1}{Re}\frac{\partial G_j}{\partial x_j} = 0 \quad (13)$$

where the primitive variables vector Q and Jacobian $\partial U/\partial Q$ are given by $$Q = \begin{bmatrix} p \\ u_1 \\ u_2 \\ u_3 \\ T \end{bmatrix}, \quad \frac{\partial U}{\partial Q} = \begin{bmatrix} \rho_p & 0 & 0 & 0 & \rho_T \\ \rho_p u_1 & \rho & 0 & 0 & \rho_T u_1 \\ \rho_p u_2 & 0 & \rho & 0 & \rho_T u_2 \\ \rho_p u_3 & 0 & 0 & \rho & \rho_T u_3 \\ \rho_p H - 1 & \rho_p u_1 & \rho_p u_2 & \rho_p u_3 & \rho_T H + \rho C_p \end{bmatrix} \quad (14)$$

with $$\rho_p = \frac{\partial \rho}{\partial p}\bigg|_T, \quad \rho_T = \frac{\partial \rho}{\partial T}\bigg|_p \quad (15)$$

Here, H and $C_p$ are the total enthalpy and specific heat at constant pressure, respectively. By replacing original Jacobian matrix $\partial U/\partial Q$ with preconditioning matrix $\Gamma$, the preconditioned Navier-Stokes equations can then be obtained.

$$\Gamma\frac{\partial Q}{\partial t} + \frac{\partial F_j}{\partial x_j} - \frac{1}{Re}\frac{\partial G_j}{\partial x_j} = 0 \quad (16)$$

In the present work, preconditioning matrix $\Gamma$ is written as follows, as originally proposed by Choi and Merkle[20] and extended later by Weiss and Smith.[21]

$$\Gamma = \begin{bmatrix} \Theta & 0 & 0 & 0 & \rho_T \\ \Theta u_1 & \rho & 0 & 0 & \rho_T u_1 \\ \Theta u_2 & 0 & \rho & 0 & \rho_T u_2 \\ \Theta u_3 & 0 & 0 & \rho & \rho_T u_3 \\ \Theta H - 1 & \rho_p u_1 & \rho_p u_2 & \rho_p u_3 & \rho_T H + \rho C_p \end{bmatrix} \quad (17)$$

where $$\Theta = \left(\frac{1}{U_r^2} - \frac{\rho_T}{\rho C_p}\right) \quad (18)$$

Here, $U_r$ is the reference velocity, and is given by $$U_r = \min(c, |v|) \quad (19)$$

where $|v|$ is the magnitude of the local velocity, and c is the speed of sound.
The reference velocity, furthermore, should not be smaller than the local diffusion velocity. Thus, $$U_r = \max\left(U_r, \frac{\mu}{\rho \Delta d}\right) \quad (20)$$

where $\Delta d$ is the characteristic cell length.
The eigenvalues of the preconditioned Navier-Stokes equations are as follows:

$$\lambda\left(\Gamma^{-1}\frac{\partial F}{\partial Q}\right) = u' - c', u, u, u, u' + c' \quad (21)$$

where $$u = v \cdot n \quad (22)$$

$$u' = u(1 - \alpha) \quad (23)$$

$$c' = \sqrt{\alpha^2 u^2 + U_r^2} \quad (24)$$

$$\alpha = \frac{1-\beta U_r^2}{2} \quad (25)$$

$$\beta = \rho_p + \frac{\rho_T}{\rho C_p} \quad (26)$$

Here, n denotes the unit outward normal vector of the cell interface. All eigenvalues have the same order of u when the reference velocity is of the same order as the local velocity. If the reference velocity is equal to the local speed of sound, the preconditioned system recovers to the original system of the non-preconditioned Navier-Stokes equations.

The compressible Navier-Stokes equations are discretized by a cell-centered, finite-volume scheme on Cartesian mesh. Equation (16) can be written in an algebraic form as $$\Gamma \frac{\partial Q_i}{\partial t} = -\frac{1}{V_i}\left[\sum_{j(i)} \Delta S_{ij} h(Q_{ij}^+, Q_{ij}^-, n_{ij}) - \frac{1}{Re}\sum_{j(i)}\Delta S_{ij}G(Q, n_{ij})\right] \quad (27)$$

where $V_i$ is the volume of the cell i. Summation index j(i) means all faces of cell i, and $\Delta S_{ij}$ is the interface area between cells i and j. $h(n_{ij})$ is an inviscid numerical flux vector normal to the control volume boundary. $Q_{ij}^+$ and $Q_{ij}^-$ are the primitive values on each side of the control volume boundary. Numerical flux h is computed by using an approximate Rieman solver of Harten-Lax-van Leer-Einfeldt-Wada (HLLEW, Obayashi, S., and Guruswamy, G. P., "Convergence Acceleration of a Navier-Stokes Solver for Efficient Static Aeroelastic Computations," *AIAA Journal*, Vol. 33, No. 6, 1995, pp. 1134, 1141), for example. The primitive variables at the dual cell interface are evaluated by the MUSCL approach (Yamamoto, S., and Daiguji, H., "Higher-Order-Accurate Upwind Schemes for Solving the Compressible Euler and Navier-Stokes Equations," *Computer and Fluids*, Vol. 22, No. 2/3, 1933, pp. 259, 270), for example in order to achieve more than third-order accuracy. The viscous flux term G is evaluated by a second-order accurate central difference.

In the present embodiment, for example, the Lower-Upper Symmetric Gauss-Seidel (LU-SGS) implicit method (Sharov, D., and Nakahashi, K., "Reordering of Hybrid Unstructured Grids for Lower-Upper Symmetric Gauss-Seidel Computations," *AIAA Journal*, No. 36, 1998, pp. 484, 486) is used for time integration. The most attractive advantage in this approximate factorization method is that the evaluation and storage of the Jacobian matrix inherent in the original formulation of the LU-SGS method can be completely removed by making some approximations to the implicit operator. The resulting LU-SGS method can be made even cheaper than the explicit method per time step.

The LU-SGS method is based on the technique of splitting node points j(i) into a group of lower triangle matrix, j∈L(i) and that of upper triangle matrix j∈U(i) for the first summation of inviscid flux in Eq. (27). With the relationship of time level n $$\Delta Q = Q^{n+1} - Q^n \quad (28)$$

Eq. (27) is solved by following the two steps involved in the Symmetric Gauss-Seidel method $$\Gamma \Delta Q_i^* = D^{-1}\left[R_i - \sum_{j\in L(i)} \Delta S_{ij} J_j^- \Gamma \Delta Q_j^*\right] \quad (29)$$

and $$\Delta Q_i = \Delta Q_i^* - \Gamma^{-1}D^{-1}\sum_{j\in U(i)} \Delta S_{ij} J_j^{-1} \Gamma \Delta Q_j \quad (30)$$

where $R_i$ is the right-hand-side residual of Eq. (27). Matrix D is given by $$D = \left[\frac{V_i}{\Delta t}I + \sum_{j(i)} \Delta S_{ij} J_i^+\right] \quad (31)$$

where $\Delta t$ denotes time steps and I is the unit matrix. Use of the flux Jacobian $J^\pm$ approximated by Jameson and Turkel, D is made diagonalization as follows $$D = \left[\frac{V_i}{\Delta t} + \frac{1}{2}\sum_{j(i)} \Delta S_{ij} \lambda_{ij}\right]I \quad (32)$$

where $\lambda_{ij}$ is the spectral radius $$\lambda_{ij} = |u_{ij}'| + c_{ij}' + \frac{u_{ij}}{\rho_{ij}\Delta d_{ij}} \quad (33)$$

LU-SGS is finally resolved by the two sweeps. First, a lower (forward) sweep:

$$\Gamma \Delta Q_i^* = D^{-1}\left[R_i - \frac{1}{2}\sum_{j\in L(i)} \Delta S_{ij}(\Delta h_j^* - \lambda_{ij}\Gamma \Delta Q_j^*)\right] \quad (34)$$

and second, an upper (backward) sweep:

$$\Delta Q_i = \Delta Q_i^* - \frac{1}{2}\Gamma^{-1}D^{-1}\sum_{j\in U(i)} \Delta S_{ij}(\Delta h_j - \lambda_{ij}\Gamma \Delta Q_j) \quad (35)$$

where $$J\Delta Q \approx \Delta h = h(Q + \Delta Q) - h(Q). \quad (36)$$

A body force is introduced at interface cell i to impose boundary conditions. The original Navier-Stokes equations of Eq. (2) can then be written as follows:

$$\frac{\partial U}{\partial t} = RHS_i + S_i \quad (37)$$

$RHS_i$ contains inviscid and viscous fluxes, and is given by $$RHS_i = -\left(\frac{\partial F_j}{\partial x_j} - \frac{1}{Re}\frac{\partial G_j}{\partial x_j}\right) \quad (38)$$

Body force $S_i$ is defined by $$S_i = -RHS_i + (RHS)_{IB} \quad (39)$$

where $(\cdot)_{IB}$ is the body force imposed by the immersed boundary method. The body force $S_i$ is introduced only to the interface cells where we wish to enforce the boundary condition on solid wall and is zero elsewhere.

The second term of Eq. (39) is evaluated by the gridless method.[15] This method requires the notion of a "cloud" and its nodal shape functions. A cloud of each interface cell contains adjacent fluid cells, interface cells, and boundary points. Flow variables at interface cell i are then estimated by the sum of the shape function and flow variables of the surrounding points in its cloud. The spatial derivative of the any particular function $f$ in the kth coordinate direction is finally written in terms of a derivative shape function $\phi$ as $$\frac{\partial f}{\partial x_k} = \sum_{n=1}^{N} \frac{\partial \phi_n}{\partial x_k} f_n \qquad (40)$$

where N is the number of nodes in the cloud being considered, subscript n denotes the index of the point belonging to the cloud. For the body forces, inviscid and viscous fluxes are computed at all mid-points between the interface cell and each member point of its cloud by using Eq. (40).

Cube Size Adjustment

Figure 14:
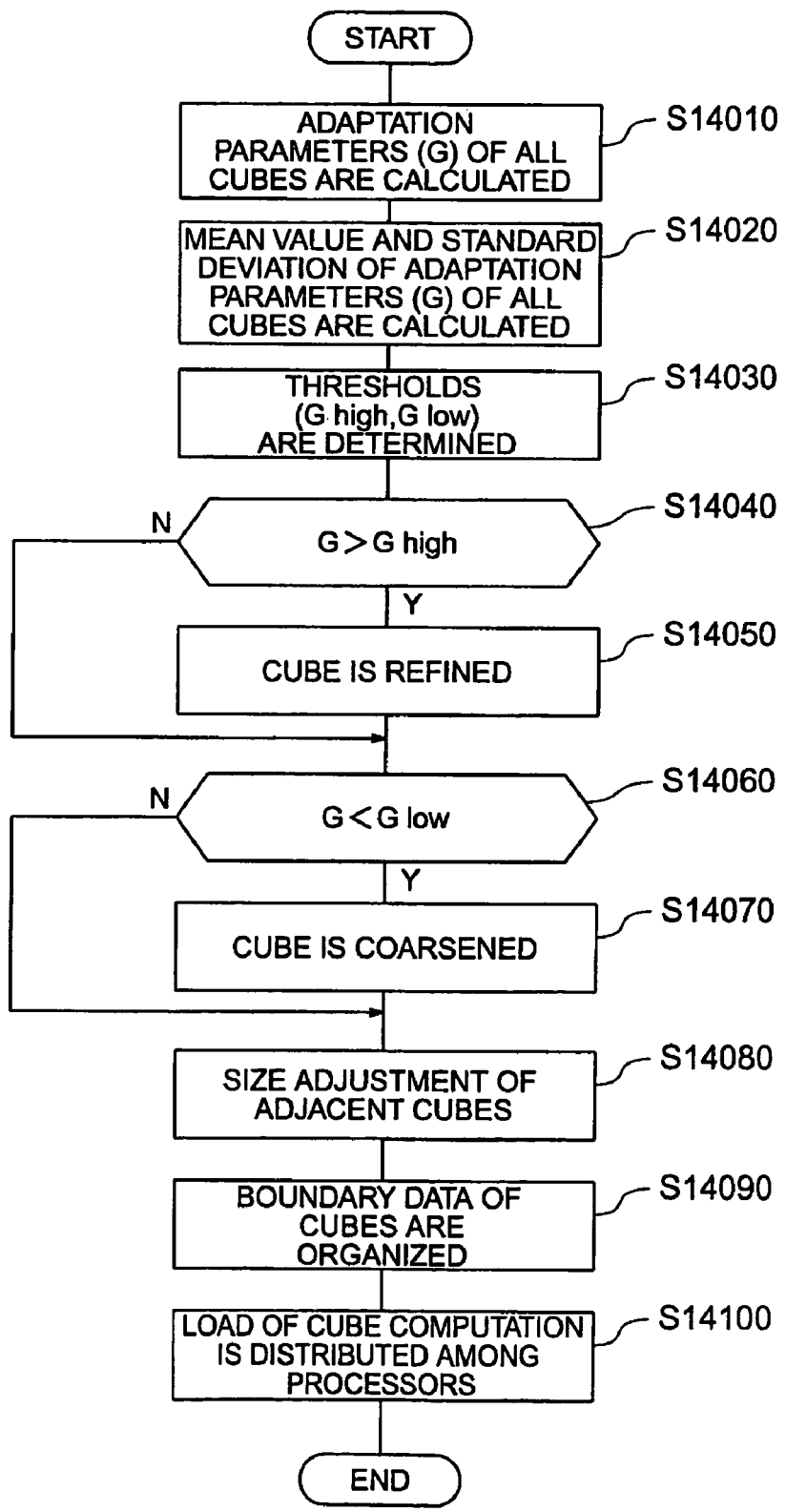
FIG. 14 is a flow chart showing a process for refining cube sizes.

FIG. 14 is a flow chart showing a process for adjusting cube sizes. The flow chart shown in FIG. 14 shows the detail of cube size adjustment in steps S01050 and S01060 of FIG. 1.

In step S14010, adaptation parameters of all cubes are calculated. The adaptation parameter is based on Laplacian filter, which is used to capture the contours in the image processing. The Laplacian filter g for selected components of the flow solution vector is given by the following equation. A component may be Mach number.

$$g_{j,k,l} = (\Delta l)^L [f_{j,k,l-1} + f_{j,k-1,l} + f_{j-1,k,l} + f_{j+1,k,l} + f_{j,k+1,l} + f_{j,k,l+1} - 6 f_{j,k,l}] \qquad (41)$$

where $\Delta l$ is the cube size and L is length scale. Increasing the value of L will result in more refinement of large cubes. However, too much increase will lead to too many cubes in smooth flow regions without sufficient cube clustering for resolving important flow features. On the other hand, decreasing the value of L will further refine small cubes. However, too much decrease will produce large spatial change in the distribution of cube size, which will degrade the solution accuracy. In the present embodiment, the appropriate value of L was empirically found to be somewhere between 0 and 1.

The adaptation parameter of a cube is defined as a sum of absolute values of Laplacians for all cells in the cube.

In step S14020, a mean value and a standard deviation of adaptation parameters of all cubes are calculated.

In step S14030, a threshold of adaptation parameter for grid refinement (Ghigh) and a threshold of adaptation parameter for grid coarsening (Glow) are determined based on the mean value and the standard deviation of adaptation parameters of all cubes.

In step S14040, it is determined whether or not an adaptation parameter of a cube is greater than the threshold for grid refinement. If the adaptation parameter of the cube is greater than the threshold for grid refinement, the process proceeds to step S14050. If the adaptation parameter of the cube is smaller than or equal to the threshold for grid refinement, the process proceeds to step S14060.

In step S14050, the cube is refined.

In step S14060, it is determined whether or not the adaptation parameter of the cube is smaller than the threshold for grid coarsening. If the adaptation parameter of the cube is smaller than the threshold for grid coarsening, the process proceeds to step S14070. If the adaptation parameter of the cube is greater than or equal to the threshold for grid coarsening, the process proceeds to step S14080.

In step S14070, the cube is coarsened.

In step S14080, cube sizes are adjusted in such away that the ratio of sizes of adjacent cubes is within a predetermined range. For example, the ratio of a size of the larger cube to a size of the smaller cube is restricted to 2.

In step S14090, cube boundary data are organized.

In step S14100, load of cube computation is distributed among a number of processors.

System Configuration

Figure 15:
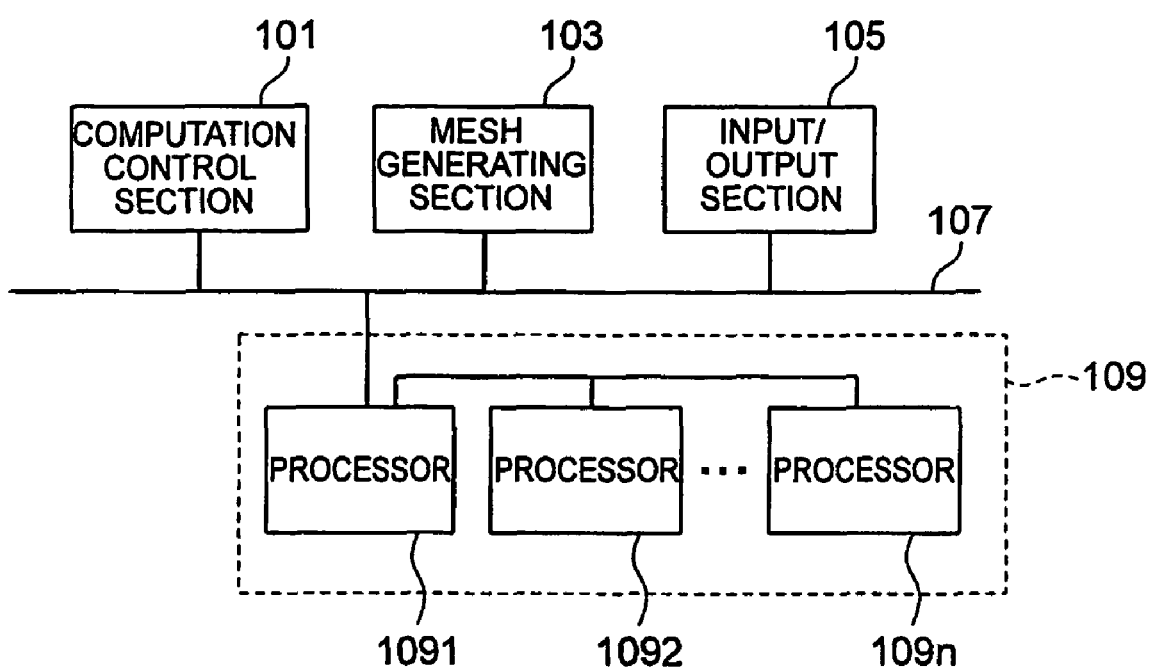
FIG. 15 shows a configuration of a simulation system according to an embodiment of the present invention.

FIG. 15 shows a configuration of a simulation system according to an embodiment of the present invention.

The simulation system includes a computation control section 101, a mesh generating section 103, an input and output section 105, a system bus 107 and a computation section 109. The computation section 109 includes n processors 1091 to 109n. The mesh generating section 103 performs the processes of cube generation and of mesh adjustment (adjustment of cube size). The computation section 109 performs the processes of fluid computation of each cube and of data exchange between cubes. The computation control section 101 performs the processes of distributing computational load among a number of processors, of deciding when to start cube size adjustment and of deciding when to complete the computation. The input and output section 105 performs the processes of receiving data of an object to be simulated and of delivering results of the simulation.

FIG. 16A shows performance of the simulation system according to the present embodiment.

Figure 16B:
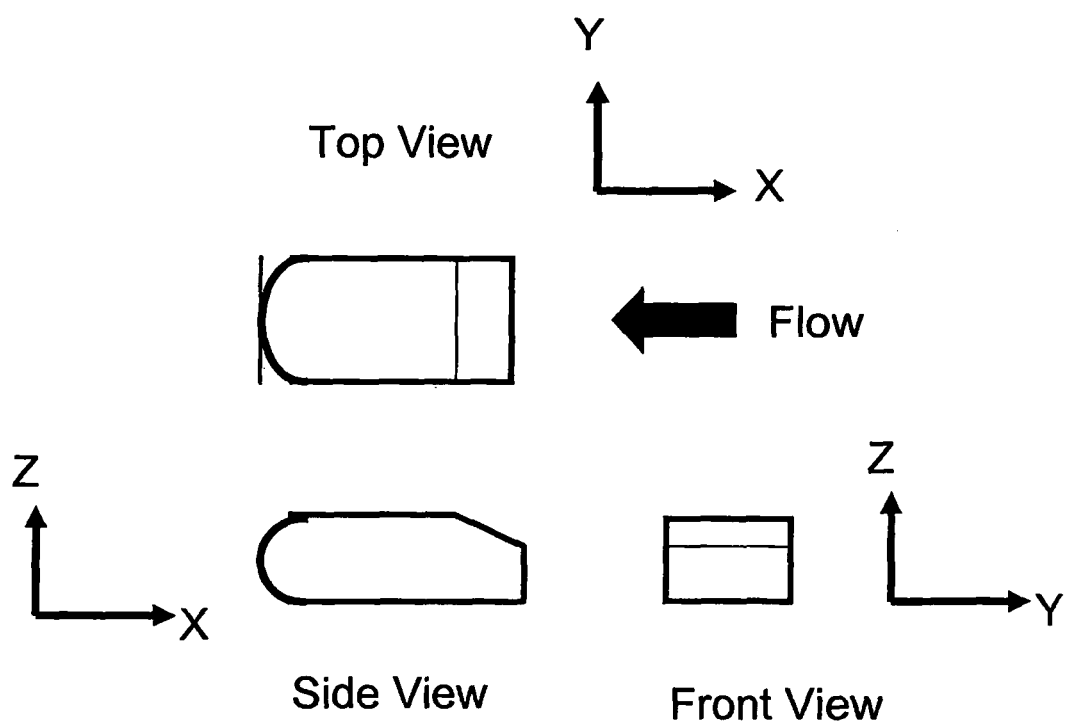
FIG. 16B shows a shape of a body around which simulation is performed to measure the performance of the simulation system shown in FIG. 16A.

FIG. 16B shows a shape of a body around which simulation is performed to measure the performance of the simulation system shown in FIG. 16A. The body is referred to as Ahrmed body. The grid number is 4 million.

The horizontal and vertical axes in FIG. 16A(a) respectively represent the number of processors (CPUs) and performance of a system provided with the corresponding number of the processors. The horizontal and vertical axes in FIG. 16A(b) respectively represent the number of processors (CPUs) and performance ratio of a system provided with the corresponding number of the processors. A system provided with the number of processors should ideally have performance proportional to the number of the processors. Performance ratio is defined as a ratio of actual performance of a system provided with the number of processors to ideal performance of the system. Performance ratio of a system provided with the number of processors is ideally 1. However, in an actual fact, the performance ratio of the system provided with the number of processors, significantly decreases with increase in the number. In the system according to the present embodiment, the performance ratio remains greater than 0.8 (80%) in the case that the number of processors reaches 64, as shown in FIG. 16A(b). The reason is that in the system according to the present embodiment, use of cubes computational load of which is substantially uniform allows substantially even distribution of computational load among the processors.

FIGS. 17 to 20 show computational results of the simulation according to the present embodiment.

Figure 18:
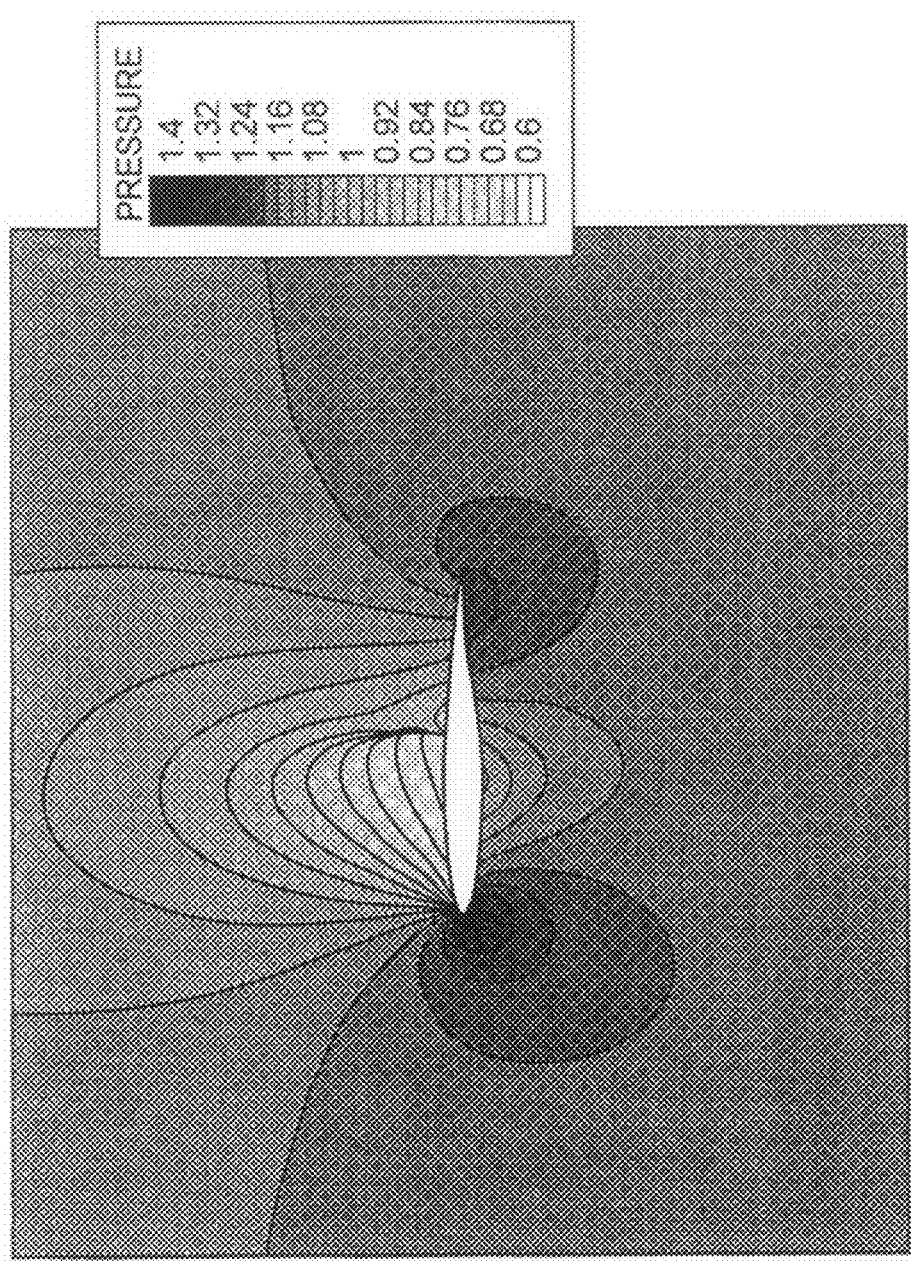
FIG. 18 shows pressure P around an airfoil.

FIGS. 17 and 18 show Mach number and pressure P around an airfoil. The inflow Mach number is 0.73. The Reynolds number is 6.56 million, and turbulent flow is assumed over the whole flow region. The angle of attack is set to 2.79 degrees. A shockwave is formed at about 55% cord length from the leading edge on the upper surface of the airfoil.

Figure 19:
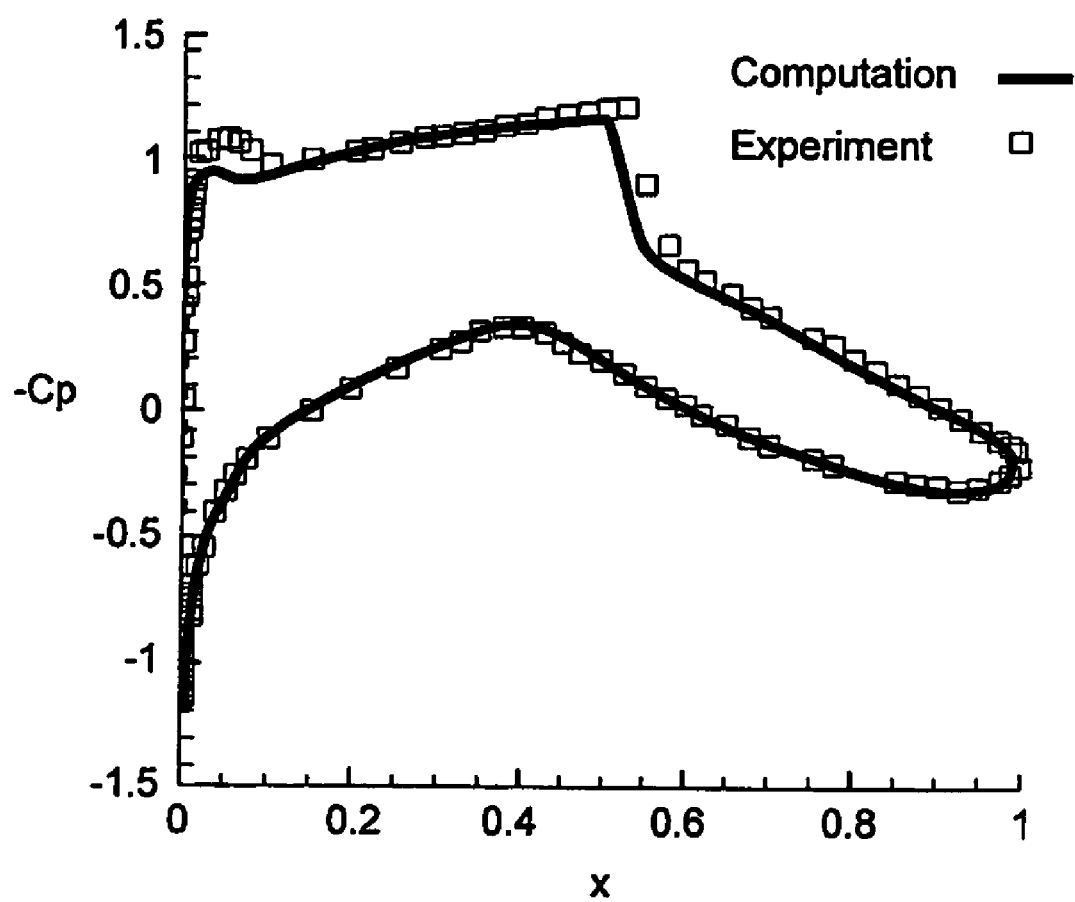
FIG. 19 shows comparison of computed surface pressure coefficient with experiment data.

FIG. 19 shows comparison of computed surface pressure coefficient with experiment data. The vertical axis in FIG. 19 represents pressure coefficient. The horizontal axis in FIG. 19 represents positional coordinate. The coordinate of the leading edge of the airfoil is 0 while the coordinate of the trailing edge of the airfoil is 1. Of the two lines, a value on the upper line represents a value on the upper surface of the airfoil while a value on the lower line represents a value on the lower surface of the airfoil. The result shows overall good agreement between the computed data and the experiment data.

Figure 20:
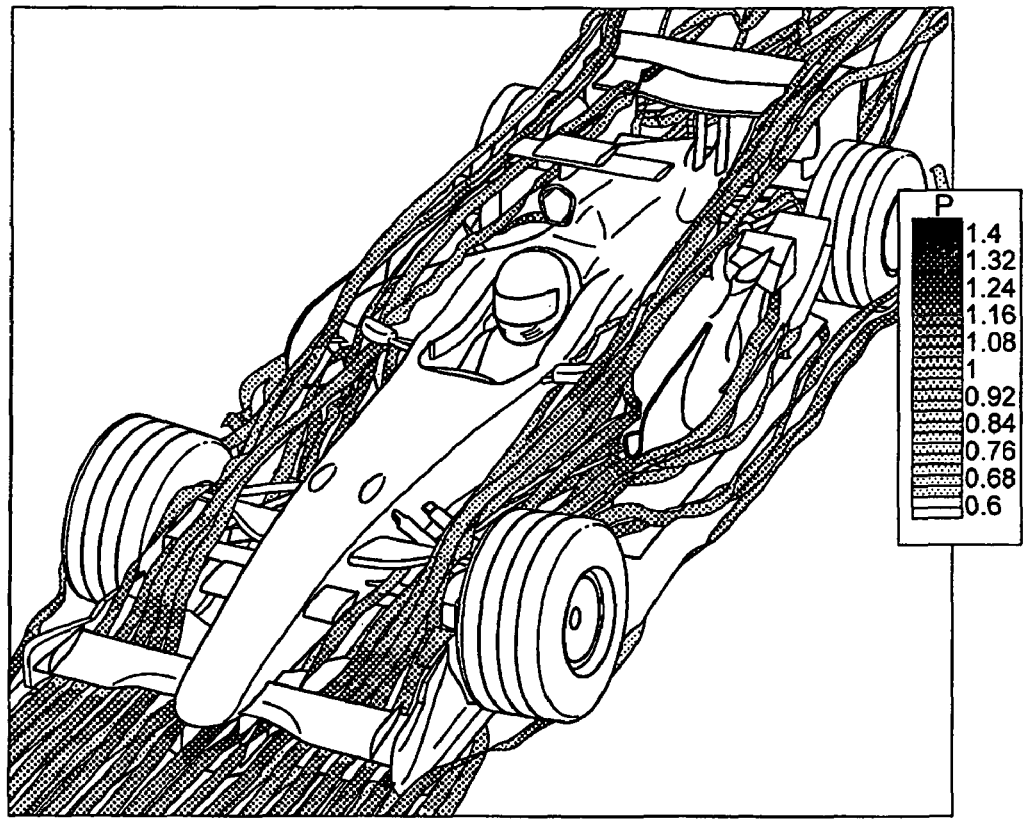
FIG. 20 shows streamline trace in the flow field near by the car model.

FIG. 20 shows streamline trace in the flow field near by the car model. FIG. 20 also shows pressure on streamlines.

As described above, a simulation method according to the present invention is good for conforming to complex geometry, application in solution adaptive grid control, application in high resolution scheme and mesh generation.

Features of embodiments of the present invention are below.

In an embodiment of the present invention, a set of the cubes is represented by leaves of a tree data structure, a leaf being an element at the lowest level of the tree data structure and number of divisions of cubes being arranged to correspond to levels of the tree data structure, so that cubes adjacent to a given cube can be determined using the tree data structure for data exchange between the given cube and the adjacent cubes.

According to the present embodiment, cubes adjacent to a given cube can be easily found using the tree data structure.

In another embodiment of the present invention, adjacent cubes are positioned at the same level or at adjacent levels in the tree data structure.

According to the present embodiment, by arranging to be position adjacent cubes at the same level or at adjacent levels in the tree data structure, a ratio of sizes between adjacent cubes is determined in a predetermined range and cube size smoothing is performed.

In another embodiment of the present invention, each cube has data of the tree data structure, including pointers to a parent and children, a pedigree and division level and data of the cells of the cube including information on whether or not each of the cells includes material therein.

According to the present embodiment, an amount of data that each cube has, is reduced.

In another embodiment of the present invention, information on whether or not each of the cells includes material therein is stored as run-length data.

According to the present embodiment, an amount of data that each cube has, is further reduced.

In another embodiment of the present invention, in the division a cube is divided into $2^N$ uniform-size cubes where N is 1, 2 or 3.

According to the present embodiment, a cube can be isotropically or anisotropically divided by changing N.

In another embodiment of the present invention, the target domain of simulation is a three-dimensional domain and a cube is in a shape of a cube or a rectangular solid.

In another embodiment of the present invention, it is determined whether or not a size of a cube is appropriate based on an adaptation parameter of the cube after a predetermined number of computational steps have been performed and the size of the cube is changed when the size is not appropriate.

According to the present embodiment, a size of a cube can be adjusted by estimating a size of the cube based on an adaptation parameter after a predetermined number of computational steps have been performed. As a result, an accuracy of simulation is improved.

In another embodiment of the present invention, near a boundary between the body and the fluid in a cube including the boundary a subgrid with mesh finer than mesh of the cells is generated besides the cells so that a higher resolution may be obtained near the boundary.

According to the present embodiment, a resolution near the boundary between the body and the fluid can be increased while the number of the cells is kept unchanged.

In another embodiment of the present invention, computational load is distributed in units of computational load for a single cube among a plurality of processors.

Cubes are provided with a uniform number of cells even when they differ in size and therefore computational load of cubes is substantially uniform. Accordingly, a desired amount of load can be distributed in units of computational load for a single cube among a plurality of processors.

What is claimed is:

1. A simulation method for flow of fluid around a body, comprising:
   dividing a target domain of simulation into a plurality of computational unit domains named cubes;
   generating an uniform number of Cartesian mesh elements named cells, in each of the cubes;
   performing computation in the cubes in each computational step; and
   exchanging data between adjacent cubes after completion of each computational step,
   wherein in dividing the target domain of simulation into cubes, division is repeated while a ratio between adjacent cube sizes is maintained in a certain range until cubes including a boundary between the body and the fluid, is small enough to obtain a desired resolution so that sizes of the cubes are appropriately determined according to a shape of the body,
   wherein, near the boundary between the body and the fluid in a cube including the boundary, a subgrid with mesh finer than mesh of the cells is generated besides the cells so that a higher resolution may be obtained near the boundary,
   wherein the subgrid comprises new computational nodes added independently of the Cartesian mesh, the new computational nodes are defined by extending an interface cell point toward an immersed surface in several steps, and each layer within the subgrid remains a constant distance from the boundary.

2. A simulation method according to claim 1, wherein a set of the cubes is represented by leaves of a tree data structure, the leaves being elements at the lowest level of the tree data structure and number of divisions of cubes being arranged to correspond to levels of the tree data structure, so that cubes adjacent to a given cube can be determined using the tree data structure for data exchange between the given cube and the adjacent cubes.

3. A simulation method according to claim 2 wherein adjacent cubes are arranged to be positioned at the same level or at adjacent levels in the tree data structure.

4. A simulation method according to claim 2 wherein each cube has data of the tree data structure, including pointers to a parent and children, a pedigree and division level and data of the cells of the cube including information on whether or not each of the cells includes material therein.

5. A simulation method according to claim 4 wherein information on whether or not each of the cells includes material therein is stored as run-length data.

6. A simulation method according to claim 1 wherein in the division a cube is divided into $2^N$ uniform-size cubes where N is 1, 2 or 3.

7. A simulation method according to claim 1 wherein the target domain of simulation is a three-dimensional domain and a cube is in a shape of a cube or a rectangular solid.

8. A simulation method according to claim 1 wherein it is determined whether or not a size of a cube is appropriate based on an adaptation parameter of the cube after a predetermined number of computational steps has been performed and the size of the cube is changed when the size is not appropriate.

9. A simulation method according to claim 1 wherein computational load is distributed in units of computational load for a single cube among a plurality of processors.

10. A system for simulating flow of fluid around a body, comprising:
   a mesh generating section dividing a target domain of simulation into a plurality of computational unit domains named cubes and for generating an uniform number of Cartesian mesh elements named cells, in each of the cubes;
   a computation section comprising at least one processor performing computation in the cubes in each computational step and exchanging data between adjacent cubes after completion of each computational step; and
   a computation control section controlling computation of simulation,
   wherein when the mesh generating section divides the target domain of simulation into cubes, division is repeated while a ratio between adjacent cube sizes is maintained in a certain range until cubes including a boundary between the body and the fluid, is small enough to obtain a desired resolution so that sizes of the cubes are appropriately determined according to a shape of the body,
   wherein, near a boundary between the body and the fluid in a cube including the boundary, a subgrid with mesh finer than mesh of the cells is generated besides the cells so that a higher resolution may be obtained near the boundary,
   wherein the subgrid comprises new computational nodes added independently of the Cartesian mesh, the new computational nodes are defined by extending an interface cell point toward an immersed surface in several steps, and each layer within the subgrid remains a constant distance from the boundary.

* * * * *